Sept. 28, 1965 K. O. BURKE 3,208,605
CARTON DESTACKING APPARATUS
Filed Feb. 13, 1963 8 Sheets-Sheet 1

FIG. 1

INVENTOR.
KENNETH O. BURKE
BY

Sept. 28, 1965 K. O. BURKE 3,208,605
CARTON DESTACKING APPARATUS
Filed Feb. 13, 1963 8 Sheets-Sheet 3

INVENTOR.
KENNETH O. BURKE
BY
*J. R. Nelson and*
*W. A. Schaich*
*Attorneys*

Sept. 28, 1965 K. O. BURKE 3,208,605
CARTON DESTACKING APPARATUS
Filed Feb. 13, 1963 8 Sheets-Sheet 4

FIG. 5

INVENTOR.
KENNETH O. BURKE
BY J. R. Nelson and
W. A. Schaich
Attorneys

FIG. 6

INVENTOR.
KENNETH O. BURKE
BY
J. R. Nelson and
W. A. Scheich
Attorneys

United States Patent Office 3,208,605
Patented Sept. 28, 1965

3,208,605
CARTON DESTACKING APPARATUS
Kenneth O. Burke, San Leandro, Calif., assignor to Owens-Illinois Glass Company, a corporation of Ohio
Filed Feb. 13, 1963, Ser. No. 258,302
7 Claims. (Cl. 214—8.5)

The present invention relates to unpiling or destacking a pile of regularly shaped articles, such as cartons or the like, and more particularly, to a machine and method for use in depalletizing these articles semiautomatically wherein the articles are piled on pallets in a pallet load and in handling are brought into a factory, such as a food cannery, where the cartons are depalletized and fed into single or multiple lines equipped with uncasers. In the lines, the uncasers empty the contents of the cartons, the latter being filled with a plurality of containers, such as glass bottles, jars, cans or the like.

Heretofore, most depalletizing has been done manually in feeding cartons into these decaser lines or conveyors, and this has been a single case-at-a-time handling operation.

The present invention provides a machine for automatically unpiling a stack of two or more cartons transferred from the pallet load, and has as an object allowing for handling two or more cartons at a time to increase the efficiency of manually depalletizing the filled cartons.

Another object of the invention is to provide a mechanism that automatically destacks cartons piled two or more high as they are moving on a horizontal conveyance, and in so doing spacing the cartons in single file array at substantially equal spacing or interval therebetween.

A further object is to provide such a mechanism as aforesaid that is simple to construct, easily maintained and flexible in its adaptation to operation with different article sizes.

Also, an object of the invention is to provide a destacker of the present invention that handles articles, such as cartons filled with glass or other fragile contents, very smoothly in unstacking a pile of them, and thereby create little if any impact on the cartons and their contents.

Another object of the invention is the provision of a stabilizer used in conjunction with the destacker of the invention which is very useful in handling open top cartons, such as trays loaded with bottle, to prevent severe impacts as these cartons or trays are unpiled.

A still further object of the invention is to provide a simple, efficient, and automatic method of unpiling a vertical stack of articles, such as cartons and the like, with slight impact in handling, and laying the articles in end-to-end relationship with substantially equal spacing therebetween.

The specific nature of this invention, as well as other objects and advantages thereof, will become apparent to those skilled in the art from the following detailed description, taken in conjunction with the annexed sheets of drawings, on which, by way of preferred example only, are illustrated embodiments of this invention.

In the drawings:

FIGS. 13 and 14 show one step, FIGS. 15 and 16 show a next step, FIGS. 17 and 18 show a further step, and FIGS. 19 and 20 show a last step.

Figure 1:
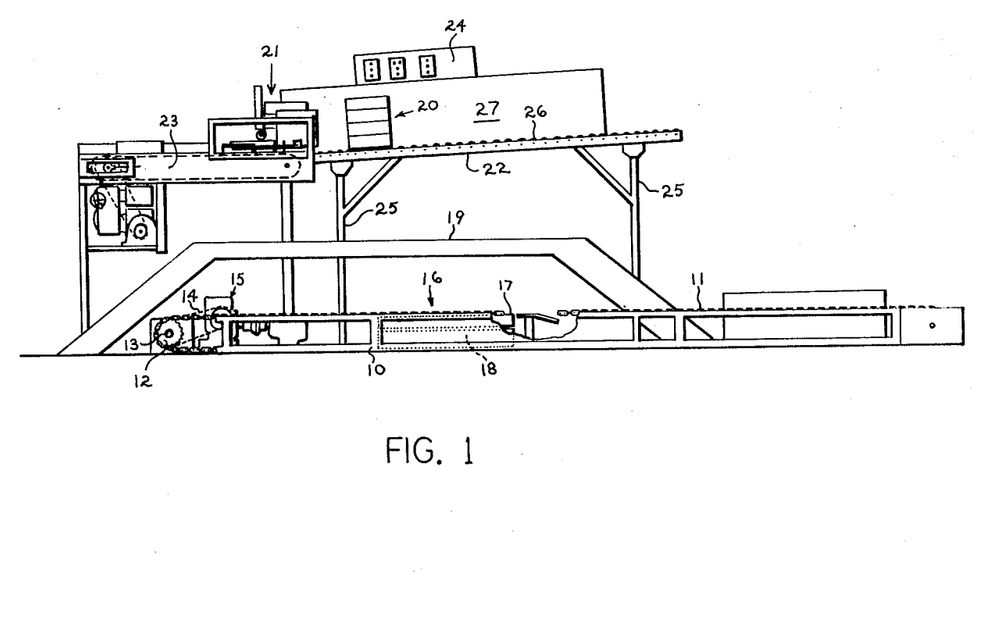
FIG. 1 is a side elevational view of the invention illustrated in use in a factory in conjunction with a depalletizing system.
Figure 2:
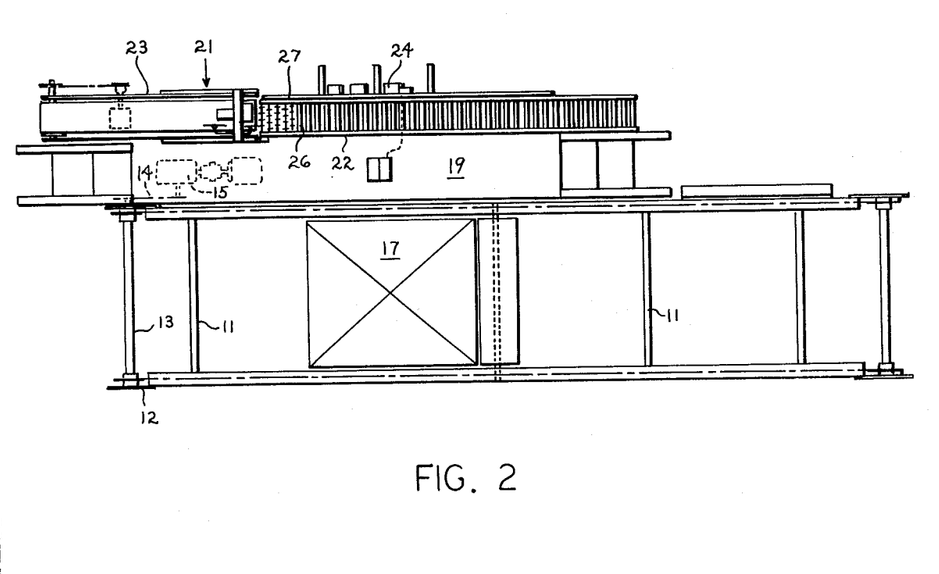
FIG. 2 is a plan view of the mechanism shown on FIG. 1.

As a preferred mode of carrying out the invention, it is illustrated in use on FIGS. 1 and 2 on depalletizing cartons of a pallet load in a factory, such as a canning factory, where the palletized loads of cartons contain empty glass containers for decasing in the filling lines of the factory. The depalletizer unit includes a frame 10 which supports an end mounted conveyor 11 that travels endlessly around sprocket 12 on the shaft 13. A drive sprocket is fastened on shaft 13 and is rotated by drive chain 14 connected to an electric power unit 15. The power unit 15 is controlled by conventional means for stopping and starting it manually to advance the conveyor 11 a desired amount. A pallet load of cartons is placed on conveyor 11 and advanced over a depalletizing station 16. At station 16 is a platform 17, which is supported by a known scissors jack mechanism 18 that is capable of elevating the pallet, as desired. An operator's platform 19 provides a place for one or more workers to manually unload cartons from the pallet load while the latter rests on the platform 17. The platform may be raised during unloading to keep the top portion of the pallet load at a convenient height. The worker thus takes a pile of two or more cartons, example of which is shown as stack 20, out of the pallet load and places same on the destacking mechanism, referred to generally as 21. The details of this mechanism will be presently described. The stack 20 proceeds through the destacker 21 and the cartons or articles thereof are successively unpiled, beginning from the bottom of the pile, to lay the articles in a single file line in end-to-end relationship. The unpiled cartons have a regular spacing between them and they proceed forward on a flight conveyor that leads to an uncaser (not shown).

The destacker 21 includes three main assemblies, the infeed section 22, the outfeed section 23, and a control panel 24.

The infeed section 22 is built upon a frame work 25 which rests upon the factory floor. The frame 25 supports an inclined gravity feed conveyor 26 made up of rollers or skate wheels or both, the latter combination being illustrated herein. At the longitudinal side of the conveyor 26 is a vertical back plate 27 attached to frame 25. Behind plate 27 is the framework for mounting the control panel 24.

Figure 5:
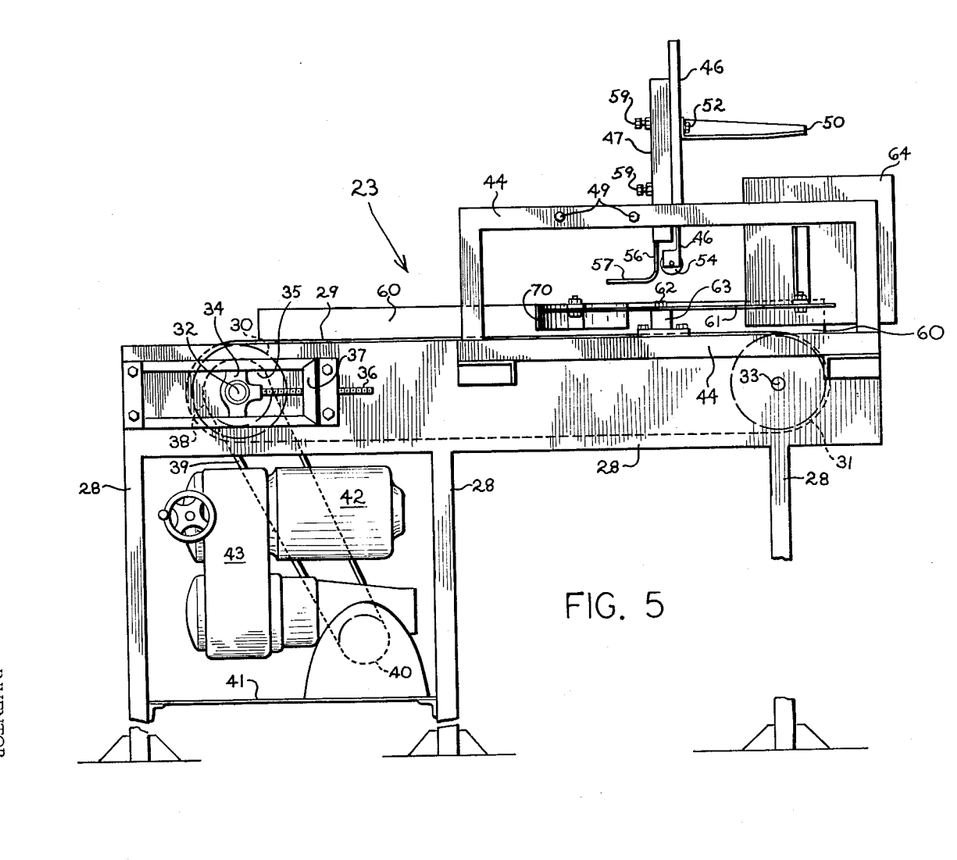
FIG. 5 is a side elevational view of the destacking mechanism.

Adjacent the end of conveyor 26 is the outfeed unit 23, which is supported on its frame 28. On frame 28 is an endless belt 29 made of a high surface friction material, for example a rubber composition. The conveyor could also be constructed with projections of various kinds for preventing slipping of an article thereon. Another device would be a perforate belt with an underlying suction hold-down means operating through the belt to keep positive driving contact of the bottom article on the belt as it goes through the destacking operation. The belt 29 is mounted for endless travel about pulleys 30 and 31 rotatably mounted on shafts 32 and 33, respectively. Shaft 32 is carried on a take-up member 34 slidable in a longitudinal ways 35. A take-up screw 36 is threaded through an end member 37 by which the tension of the belt 29 may be adjusted. A drive sprocket 38 is keyed on shaft 32 and driven by drive belt 39 reeved over the drive pulley 40. A base plate 41 attached across the legs of frame 28 supports a power unit comprised of an electric motor 42 and a known PIV (variable speed) transmission 43. The drive gear 40 is rotated by the output shaft of the transmission 43 to propel the belt 29 in a counterclockwise direction (right-to-left) on FIG. 5.

Figure 6:
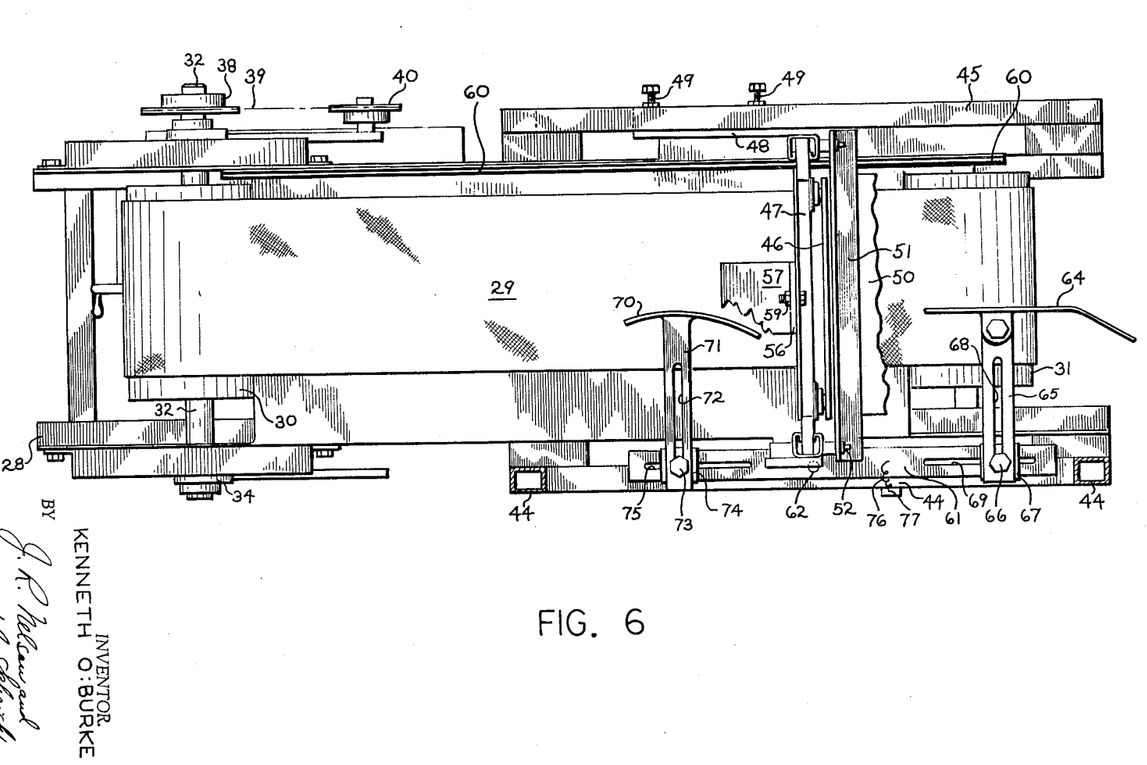
FIG. 6 is a plan view of the mechanism of FIG. 5.
Figure 7:
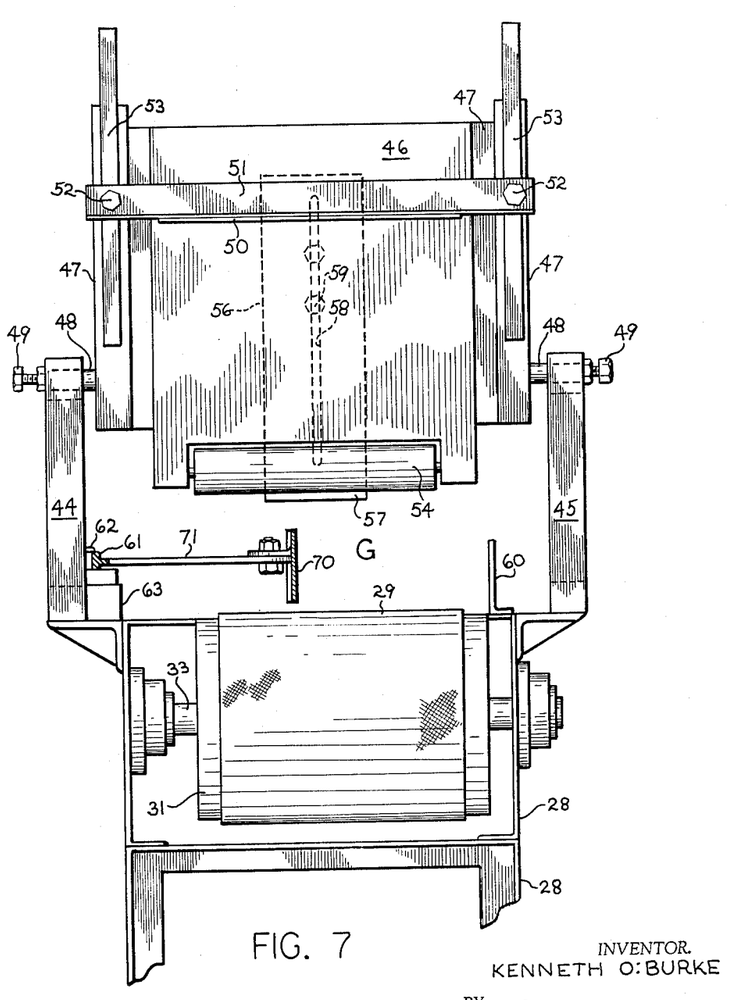
FIG. 7 is an end elevational view of the mechanism of FIGS. 5 and 6 viewed forward along the conveyor, or viewed from the right-hand end of either FIG. 5 or FIG. 6.
Figure 8:
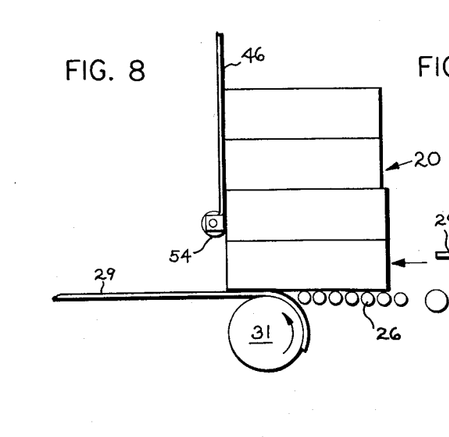
FIGS. 8–12 are a sequence of schematic views of the destacking action of the invention illustrating the handling of a vertical pile of rectangular cartons.
Figure 9:
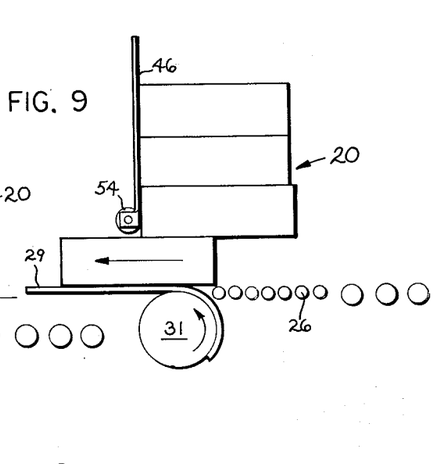
Figure 10:
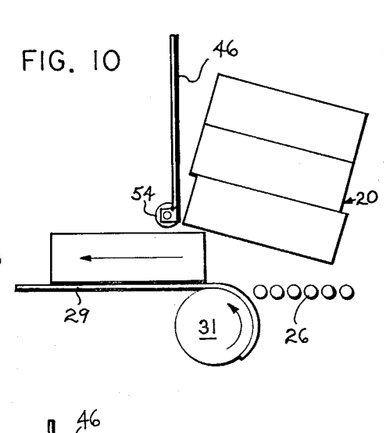
Figure 11:
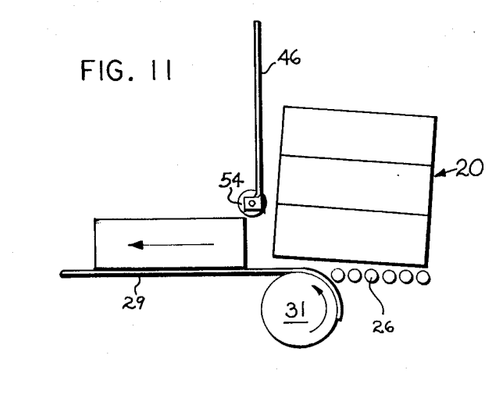
Figure 12:
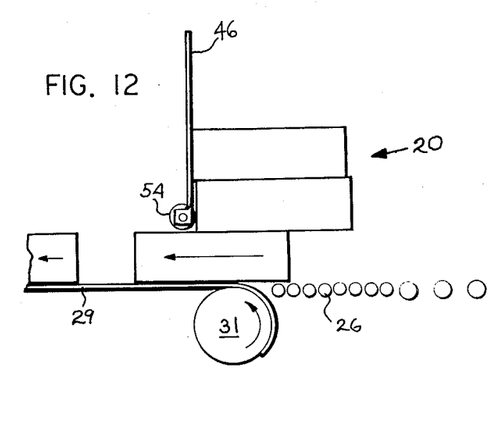
Figure 13:
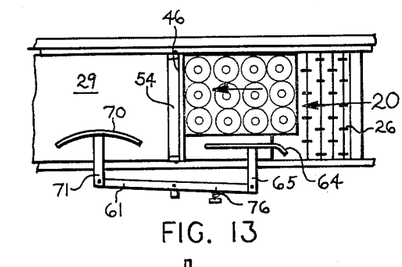
FIGS. 13–20 are a series of corresponding plan and side elevation views, respectively being numbered as the odd and even number figures, which illustrate the stabilizer mechanism of the invention used in destacking a vertical pile of trays that are filled with bottles or cans which protrude, in normal fashion, above the tops of the trays. These figures show the method being practiced in a series of steps, that is.
Figure 14:
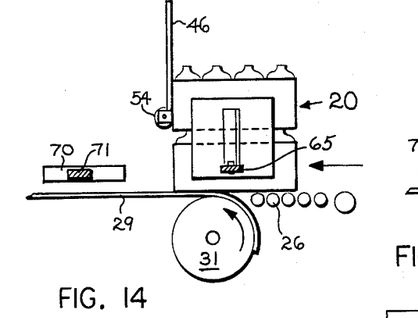
Figure 15:
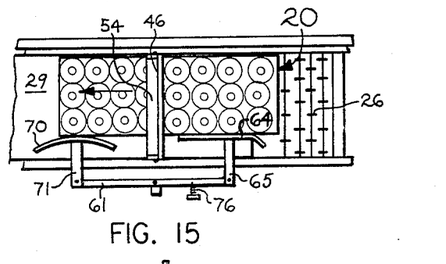
Figure 16:
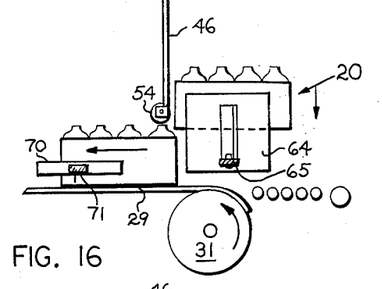
Figure 17:
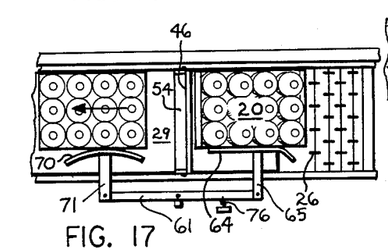
Figure 18:
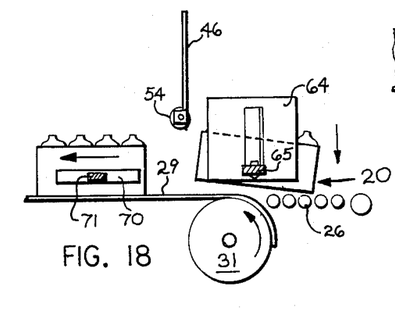
Figure 19:
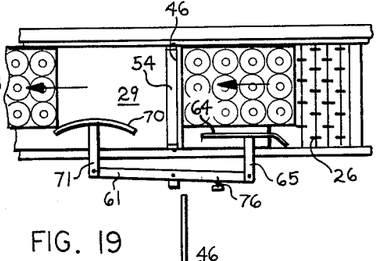
Figure 20:
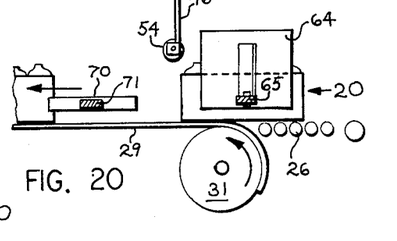

Along the opposite sides of belt 29 are side frames 44 and 45, each connected to the framework 28. These side frames 44 and 45, as seen on FIG. 5, support the stop means which is comprised of the vertical stop member 46 attached to holders 47 that are attached to an adjustable member 48 bolted to frames 44 and 45, such as at studs 49 (FIGS. 6 and 7). The stop member 46 by its mounting 47, 48 is also adjustable vertically to define a gate space G (FIG. 7) that is slightly greater than the height of one carton of stack 20. Thus, the lowermost carton of a stack 20 will be permitted to be conveyed through gate G by belt 29. This mounting for stop member 46 also permits its lengthwise adjustment over belt 29. Ideally, the stop member is located a distance of about three-quarters the length of one of the cartons in stack 20 so that the stack advances to engage stop member 46 and the rear edge of the stack rests on the skate-wheels or rollers of conveyor 26. It is important, and likewise critical, to the invention that the stop member be adjusted lengthwise of conveyor surface 29 so that it will engage the stack 20 and stop its movement forward before the rear edge of the carton leaves the unpowered support of the infeed conveyor 26 or a dead plate section thereof adjacent the end of the live belt 29.

Attached at the front side of stop member 46 is a horizontal shelf 50 which has an integral angle iron 51 bolted at 52 in slots of uprights 53 on the holders 47. This shelf 50 is adjustable for height over the surface of conveyor 29 and is especially important when the stack 20 includes cube-type cartons (having the dimensions of a cube), for example two in a stack. If the carton is a cube in shape, or its width dimension is equal to or more than its forwardly directed bottom dimension, the upper carton will have a tendency to revolve by 90° about its back edge as the underneath carton is fed underneath the stop member 46. This shelf 50 prevents backward tipping of the second carton of a stack 20.

At the underside of stop member 46 is a freely rotatable end-mounted roller 54. The roller 54 guides cartons under the lower edge of member 46 through the gate G. Beyond roller 54 and overlying the belt 29 is a hold-down device 55 attached at the back side of stop member 46 on the holder 47. This device is an L-shaped member having an upper leg 56 and a horizontal tongue 57. The upper leg 56 is slotted at 58 and bolted by studs 59. This means of fastening the hold-down device 54 onto the holder 47 permits vertical adjustment of the tongue 57 in the gate G. As the lower carton of stack 20 advances under stop member 46, the upper cartons slide to the rear of the lower carton. This exerts a force on the lower carton tending to revolve it about its lower, rear edge and thereby raise the front edge from belt 29. The end result will be an abrupt forward reaction of the lower carton, much like a "tiddlywink" reaction. The tongue 57 is positioned so that a carton passing through gate G will be held down until the upper cartons of the stack slide free of it, and this will prevent the just-described (tiddlywink) reaction from occurring. The articles are thus handled much more gently without any tendency to revolve or jump out of position on belt 29 during destacking.

Figures 3, 4:
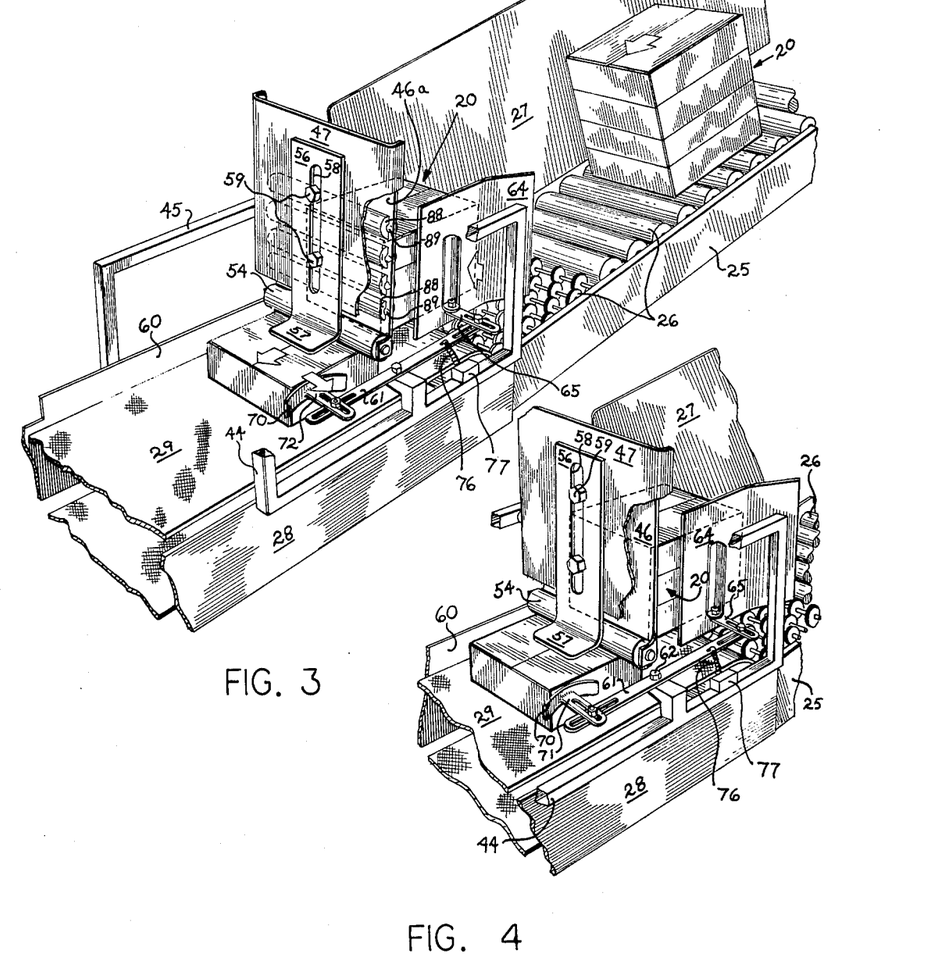
FIG. 3 is a three-quarter front perspective view of one form of the mechanism of the present invention, and shows the means for stabilizing cartons that are undergoing destacking.
FIG. 4 is a perspective view like FIG. 3 and shows another form of mechanism of the invention.

A further variant of the invention is shown on FIG. 3. In this construction, the stop member 46a is slotted to accommodate a plurality of vertically spaced rollers 88 arranged in a generally vertical bank along the front face of the member. These rollers are pivoted in bearings 89 in the member 46a. This structure allows better vertical transitory movement of the upper cartons of stack 20 as the lower one is stripped from beneath them in destacking, and allows free lowering of them toward and onto the conveyor 29.

The structure of the destacker mechanism 21 also includes a longitudinal side guide means at one side of the belt 29. This is shown on FIGS. 3, 4 and 7 as elongated vertical side plate 60 having a lateral angle attached to the frame 28. This guide plate 60 extends through the destacking station on either side of stop member 46 and is mounted in substantial alignment with the side plate 27 of the infeed conveyor unit. This serves as a positive side guide means for aligning the stack 20 of cartons after it transfers from the infeed section 22 onto the outfeed section 23 inclusive of travel through the destacker mechanism 21.

In conjunction with this side guide means, just described, is a stack stabilizer means which comprises a longitudinal rocker arm 61 that is pivotally mounted by an intermediate rock pin 62 held in a boss 63 fastened on the side frame 44. This arm 61 extends along the side of belt 29 on either side of the stop member 46. A vertical stack retainer pad 64 is attached on a lateral, slotted member 65 that is adjustably attached to the front end of the arm 61 by bolt 66 and clamp 67. The slot 68 in the member 65 allows for adjustment of the pad 64 laterally of the conveyor 29 toward or away from the fixed guide 60. The forward end of arm 61 is also slotted at 69 (FIG. 6) for adjusting the longitudinal position of pad 64 with respect to the stop member 46. On the rearward, or other end, of arm 61 is a curved shoe 70 fastened on a laterally depending bracket 71. Bracket 71 is slotted at 72 to receive a bolt fastener 73 and clamp 74 which attaches into the slot 75 in arm 61. This construction similarly provides for lateral adjustment of shoe 70 toward or away from fixed guide 60 and for longitudinal adjustment toward or away from stop member 46. These adjustments, as described, for pad 64 and shoe 70 locate these members for operation to correspond with a given size of carton.

This stabilizer means is set-up to operate as follows: Referring to FIGS. 13–20, as well as FIGS. 6 and 7, the lower carton of a stack 20 passes beneath stop member 46, while the latter stops and holds the upper cartons of the stack. The lower carton slides from beneath the stack and engages the curved face of shoe 70. The shoe 70 is held in the path of this carton by a spring 76 connected between rocker arm 61 and frame 44. The spring 76 is clamped on the frame by block 77. This contact shifts the shoe 70 outwardly and rocks arm 61 counterclockwise causing the pad 64 to move laterally inwardly and engage the side of the upper cartons of the stack holding them against the fixed guide 60. The pad 64 exerts a squeezing action on these upper cartons and prevents their free fall onto conveyor 29 after the lower carton passes from beneath the stack. As this lower carton progressively passes out of contact with the curved face of shoe 70, the squeezing pressure exerted by pad 64 is gradually released correspondingly by the rocking of arm 61 and the upper cartons of the stack are gently lowered onto the conveyor. The now bottom carton will repeat the manipulation of the shoe 70 and pad 64 until the pile is completely destacked.

FIGS. 13–20 schematically illustrate this action of the destacking method. The articles of stack 20 are shown as open top trays filled with bottles which protrude above the tray. In such an arrangement, the stabilizer means is very effective, because should the tray be allowed to receive a sharp impact by a free fall in destacking, the bottles will bounce and in some cases this may be severe enough to dislodge the bottles from the tray or foul the mechanism. In this invention, the stabilizer means may be used in combination with or in place of the stabilizer shelf, described earlier.

FIGS. 8–12 illustrate schematically the destacking action of a pile of closed rectangular cartons. In this case, it is possible to destack a pile or stack of the articles as 20 without the aid of a stabilizer shelf 50 or the stabilizer means 64, 70.

As shown on the drawings, the cartons are singularly pulled from the bottom of the stack 20 by the belt 29 while the upper articles are held by the stop member 46. As the lower carton clears the stack, the upper cartons fall as a group onto the conveyors 29 and 26. This proceeds much like dealing from the bottom of a deck of cards until the pile of the articles is laid end-to-end on the advancing conveyor means.

While embodiments of the present invention have been herein specifically described, other embodiments and variations may occur to those skilled in the art after a knowledge of the disclosure herein, and it is desired to include within the scope of the patent granted hereon all such embodiments and variations, and more particularly as comprehended by the appended claims.

I claim:

1. A destacking mechanism comprising a gravity type infeed conveyor adapted for receiving a vertical stack of two or more articles thereon and advancing them toward a discharge end thereof, a generally horizontal outfeed conveyor disposed longitudinally in an abutting end-to-end relationship to the discharge end of said infeed conveyor, a stop means overlying said outfeed conveyor and located less than one article length from the one end thereof adjacent the infeed conveyor for intercepting the stack of articles advanced to it from said infeed conveyor, the stop means being vertically spaced over said outfeed conveyor to define a gate opening that will permit but the single lowermost article in said stack to pass therebeneath, said stop means comprising a vertical frame means disposed above said outfeed conveyor, a plate-like element, means mounting the plate-like element vertically on said frame, plural rollers rotatably mounted on the front side of said element and disposed transversely of said outfeed conveyor, the lowermost of said rollers defining said gate opening, an article hold-down device, means adjustable for mounting the latter on the back-side of said element, said device having a tongue extending rearwardly substantially parallel with the top of said outfeed conveyor and spaced vertically substantially one article height above the outfeed conveyor, and means connected to drive the outfeed conveyor for advancing the lowermost article of the stack through said gate opening whereupon overlying articles of the stack are held against forward movement by engagement with the rollers of said plate-like element, the articles of said stack being stripped one at a time from the bottom thereof and laid in succession in a single file relationship on said outside conveyor.

2. A destacking mechanism comprising an infeed conveyor adapted for receiving a vertical stack of two or more articles, a generally horizontal outfeed conveyor having one end adjacent an end of said infeed conveyor, a stop means overlying said outfeed conveyor and located less than one article length from said one end for intercepting the stack of articles advanced to it from said infeed conveyor, the stop means being vertically spaced over said outfeed conveyor to define a gate opening that will permit but one article in said stack to pass therebeneath, means connected to drive the outfeed conveyor for advancing the lowermost article of the stack through said gate opening while overlying articles of the stack are held against forward movement by said stop means, the articles of said stack being stripped one at a time from the bottom thereof and laid in single file on the outfeed conveyor, and a side guide means mounted to extend on either side of said stop means and along one side of the conveyor and an article stabilizer means mounted along the opposite side of the conveyor, the stabilizer means being operated by the lower article of the stack passing through said gate opening and along the guide means for holding the other article of the stack against a free gravity fall into the space vacated by said lower article, the impact on said other articles being thereby reduced as they are lowered onto the conveyor.

3. The apparatus of claim 2, wherein the stabilizer means comprises a horizontal rock arm, means for pivotally mounting said arm intermediate its ends at the side of the conveyor and near the stop means, a vertical pad connected to the arm and carried thereby on the forward side of the stop means, a shoe connected to the arm and carried thereby on the rear side of the stop means, the shoe having a convex curved surface facing the center of the conveyor, the arm, pad and shoe being constructed and arranged with respect to the pivot therefor and the stop means so that the article moving through the gate will engage the shoe and rock the pad into engagement with the other articles of the stack and squeeze them against the guide means thereafter causing them to be gradually lowered into the conveyor as said moving article advances beyond said curved shoe which gradually releases the squeezing pressure of the pad exerted by the displacement of the shoe.

4. The apparatus of claim 3, which includes spring means connected to the arm normally rocking the shoe into the path of an article advancing on the conveyor.

5. A carton destacking mechanism comprising a gravity-type conveyor means for moving a stack of cartons deposited thereon by gravity flow toward an unpiling station adjacent the discharge end of said conveyor means, means for engaging the lowermost article of the stack comprising a driven conveyor surface operated for moving the stack forward thereon under the power of said conveyor surface, means for intercepting the forward movement of the upper articles of the stack exclusive of the lowermost article thereof at the unpiling station, the lowermost article being advanced by said conveyor surface from beneath said upper articles of the stack, said intercepting means including a hold-down device depending longitudinally rearwardly to engage the lower article and hold it flat against said conveyor until it is free from said stack, means engaging said upper articles at their opposite sides and operated responsive to said lowermost article of the stack passing beneath said intercepting means for arresting them and providing for gently lowering said upper articles one article height at a time onto said conveyor surface, the lowermost article of said stack being successively advanced from said stack beneath said intercepting means on the conveyor surface.

6. The carton destacking mechanism defined by claim 5, wherein the intercepting means comprises a vertical plate-like element mounted transversely overlying the conveyor surface and spaced therefrom to define a gate opening permitting passage of but one article in said stack, means connected to said element and depending from the front thereof for engaging the upper articles of the stack stabilizing them against tipping as the lowermost article is moved from beneath them.

7. The mechanism defined in claim 5, wherein the means engaging said upper articles at their opposite sides comprises means along one side of the conveyor disposed ahead of the intercepting means engageable with one vertical side of articles of said stack, a longitudinal rock arm, means pivotally mounting said arm at the other side of said conveyor opposite said last-mentioned means so that the arm extends on either side of said stop means, a shoe carried on one end of the rock arm disposed in the path of an article passing beneath said intercepting means, a pad connected to the other end of said arm disposed ahead of the stop means and opposite said means at the one side of the conveyor, the lowermost article passing said intercepting means engaging said shoe and rocking said arm to engage said pad with at least one of the articles of the stack above the lowermost article thereof and thereby applying side pressure to such articles responsive to longitudinal movement of an article on the conveyor and engaging said shoe.

References Cited by the Examiner

UNITED STATES PATENTS

| | | | |
|---|---|---|---|
| 1,000,347 | 8/11 | Schmidt | 221—259 X |
| 1,252,327 | 1/18 | Dorion | 221—259 |
| 2,814,397 | 11/57 | Connell | 214—8.5 X |
| 2,819,819 | 6/58 | Warren | 221—256 |
| 3,024,944 | 3/62 | Pierce | 221—11 |

FOREIGN PATENTS 1,086,611   8/60   Germany.

HUGO O. SCHULZ, *Primary Examiner.*

MORRIS TEMIN, *Examiner.*